July 4, 1933.  R. C. SMITH  1,916,538
CHECK PROTECTOR
Filed Nov. 7, 1930  4 Sheets-Sheet 1

Witness:
William P. Kilroy

Inventor:
Ray C. Smith
By Otto M. Wernich Attys

July 4, 1933.  R. C. SMITH  1,916,538
CHECK PROTECTOR
Filed Nov. 7, 1930   4 Sheets-Sheet 2

Witness:
William P. Kilroy

Inventor.
Ray C. Smith
By Otto M. Vernmel Attys

July 4, 1933.  R. C. SMITH  1,916,538
CHECK PROTECTOR
Filed Nov. 7, 1930   4 Sheets-Sheet 3

Witness:
William P. Kilroy

Inventor:
Ray C. Smith
Otto M. Vermeer
Attys

July 4, 1933.  R. C. SMITH  1,916,538
CHECK PROTECTOR
Filed Nov. 7, 1930  4 Sheets-Sheet 4

Witness:
William P. Kilroy

Inventor:
Ray C. Smith
By Otto M. _____ Attys

Patented July 4, 1933

1,916,538

UNITED STATES PATENT OFFICE

RAY C. SMITH, OF CHICAGO, ILLINOIS, ASSIGNOR OF ONE-HALF TO EDITH A. BOYDSTON, OF CHICAGO, ILLINOIS

CHECK PROTECTOR

Application filed November 7, 1930. Serial No. 494,009.

The invention relates to check protectors and has as its principal object the provision of a simple construction whereby type carriers may be set up in any desired relation to print any desired combination of numerals and which perforates the check to indicate the amount for which the check is drawn and in addition inks this portion or perforations of the check.

The invention has among its principal objects the provision of a plurality of setting devices, each of which may be set in any one of several positions for cooperation with type carrying elements to thereby cause said type carrying elements to be arranged in any one of several different positions, in which position said type carrying elements are held to allow a platen to cooperate with the characters on the type carrying elements to engage the characters and cause the check to be perforated to denote the amount for which the check is drawn.

It is another object of the invention to provide a perforating mechanism which is operable to perforate the check along that portion having inscribed thereon the name of the person or firm to whom the check is issued and to cause this portion of the mechanism to be actuated prior to the mechanism which applies the characters or numerals which denote the amount for which the check is drawn to thereby employ the first mentioned perforating means to provide means for holding the check against movement during the second mentioned perforating operation.

It is also an object of the invention to provide means for inking the type carried by the type carrying elements and to apply the ink thereto during movement thereof relatively to the setting devices.

It is another object of the invention to provide a device of the character above referred to which has a plurality of setting devices, each of which is provided with means whereby said devices are held in any one of a plurality of angularly adjusted positions and to provide means for releasably locking said elements against movement during the perforating operation.

In addition, it is an object to provide setting devices, each of which has an element providing a stop which may be arranged in anyone of a plurality of angularly disposed positions and held in these positions and to employ type carrying elements which are movable into engagement with said stops to thereby arrange and hold certain selected characters provided upon the type carrying elements relatively to a platen hereinabove referred to.

It is another object of the invention to provide means whereby all of the type carrying elements may be restored from a set position to an inoperative position when same have performed their function and in addition to provide means for restoring all of the setting elements to a zero or neutral position.

It is a further object of the invention to arrange the setting devices and the type carrying elements upon a shaft, the setting devices being movable about the axis of the shaft as a center to thus arrange the stops of the setting devices in anyone of several angular positions and to employ type carriers which are loosely mounted upon said shaft and to associate with the type carriers means for moving the type carriers into cooperative relation or set position of said stops.

It is also an object to provide a means such as that just referred to with means for restoring the type carriers to a neutral or inoperative position.

The invention will be explained and more readily understood when read in conjunction with the accompanying drawings which illustrate one embodiment of which the invention is susceptible, it being manifest that changes and modifications may be resorted to without departing from the spirit of the appended claims forming a part hereof.

In the drawings, Fig. 1 is a plan view of a device embodying the invention;

Figure 4:
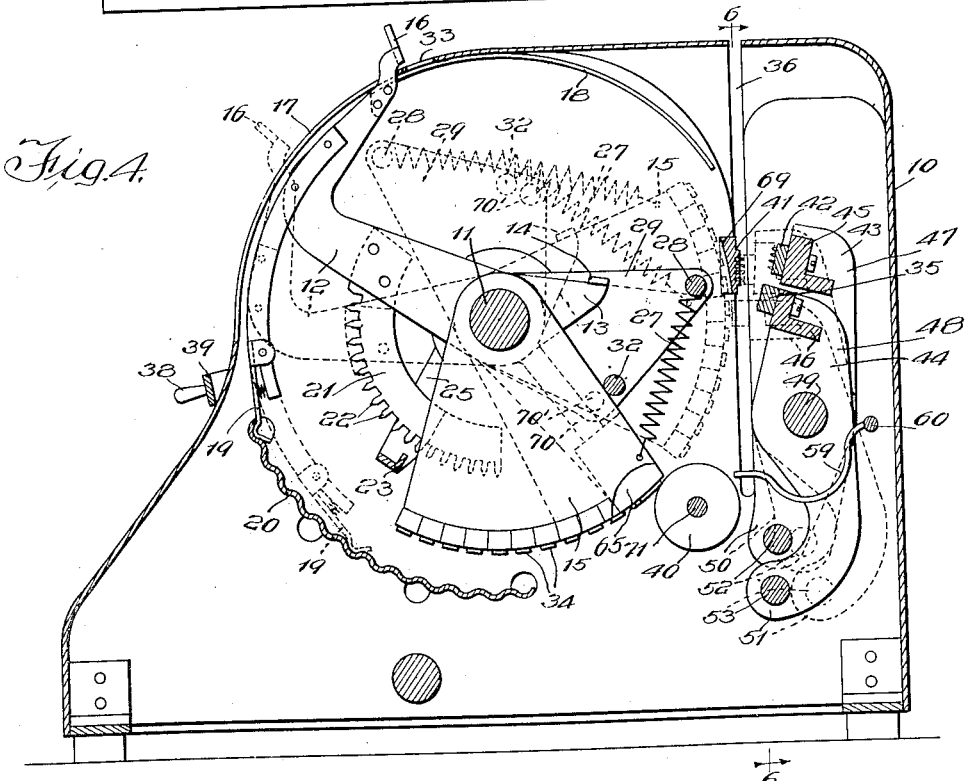
Fig. 4 is a section taken on line 4—4 of Fig. 1.
Figure 7:
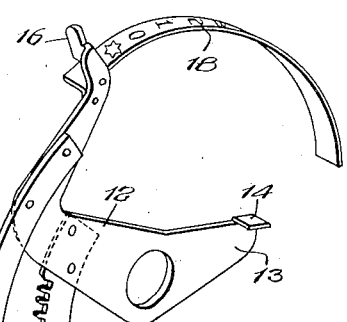
Fig. 7 is a perspective view of one of the setting devices employed in the structure.
Figure 5:
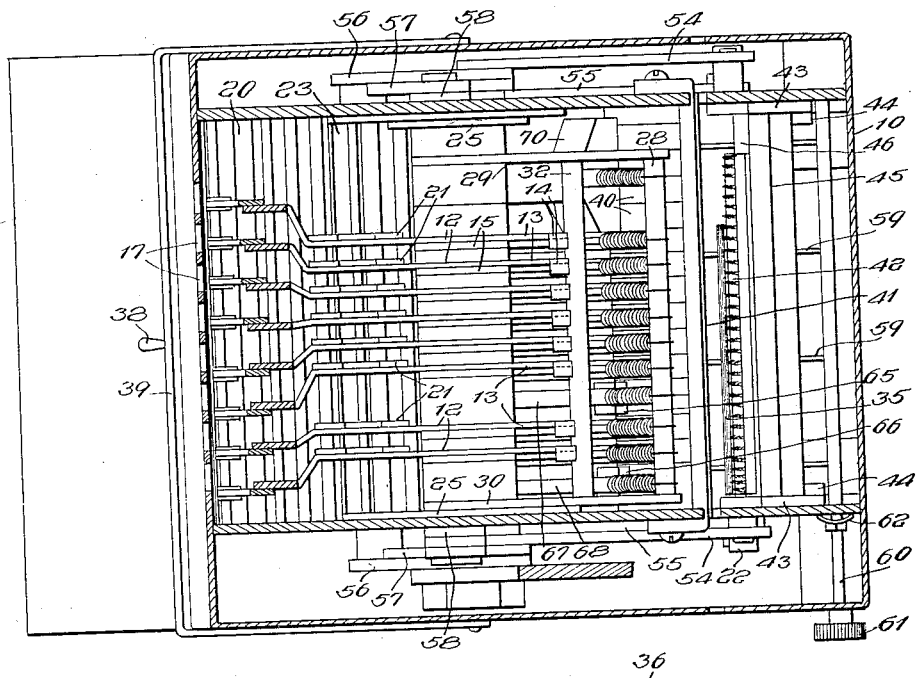
Fig. 5 is a sectional plan view of the structure shown in Fig. 4.

By referring particularly to Fig. 4, it will be noted that the structure for accomplishing the invention contemplates the provision of a casing 10 in which is housed a mechanism for accomplishing the various objects hereinbefore referred to. This mechanism includes a shaft 11 upon which is mounted a plurality of type setting devices 12. These setting devices 12 are each provided with the extension 13 having a projection 14 which acts as a stop to limit rotative movement of the type carrying elements such as those generally designated 15, the latter of which are loosely mounted for rotation about the shaft 11. The setting devices generally designated 12 each include a finger piece 16 which project through its respective slot 17 provided in the casing 10 and these setting devices each carry a strip or band 18, upon the face of which is provided with numerals corresponding to those provided upon the type carriers 15. Each of the setting devices 12 include a resilient member 19 which is provided to cooperate with the corrugated member 20. The resilient members 19 of each setting device 12 and the corrugated element 20 provide means for adjustably holding the setting devices generally designated 12 in anyone of a plurality of angularly adjusted positions. The corrugated member 20 extends parallel to the shaft 11 and is of arcuate formation so that the resilient element 19 may cooperate therewith during rotation of the setting devices 12. Each of the setting devices 12 are provided with an arcuate element 21 which has one edge thereof provided with a plurality of teeth 22 with which a holding member 23 is adapted to cooperate to releasably lock the setting device 12 in anyone of its adjusted positions.

Figure 8:
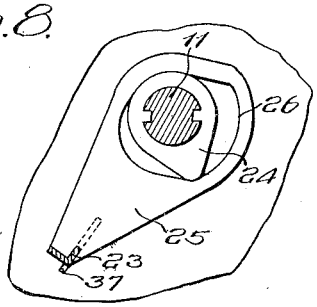
Fig. 8 is a detail view of a mechanism for cooperating with the structure shown in Fig. 7 to lock the same against rotation.

The locking of the setting device is accomplished through the medium of the structure most clearly shown in Fig. 8 which includes a cam 24 secured to the shaft 11 and arms 25 arranged upon opposite sides of the machine. These arms 25 carry the holding element 23 and are provided with a cam track 26 in which the cam 24 is designed to rotate and move the arms 25 and the holding element 23 into and out of cooperative relation with the teeth 22.

Figure 1:
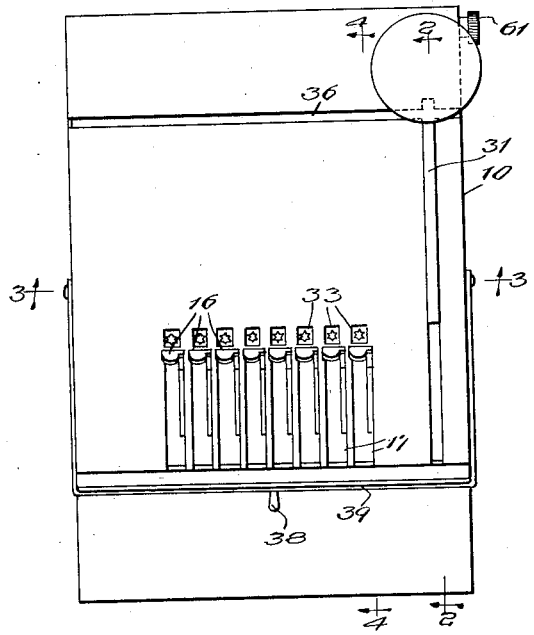
Figure 2:
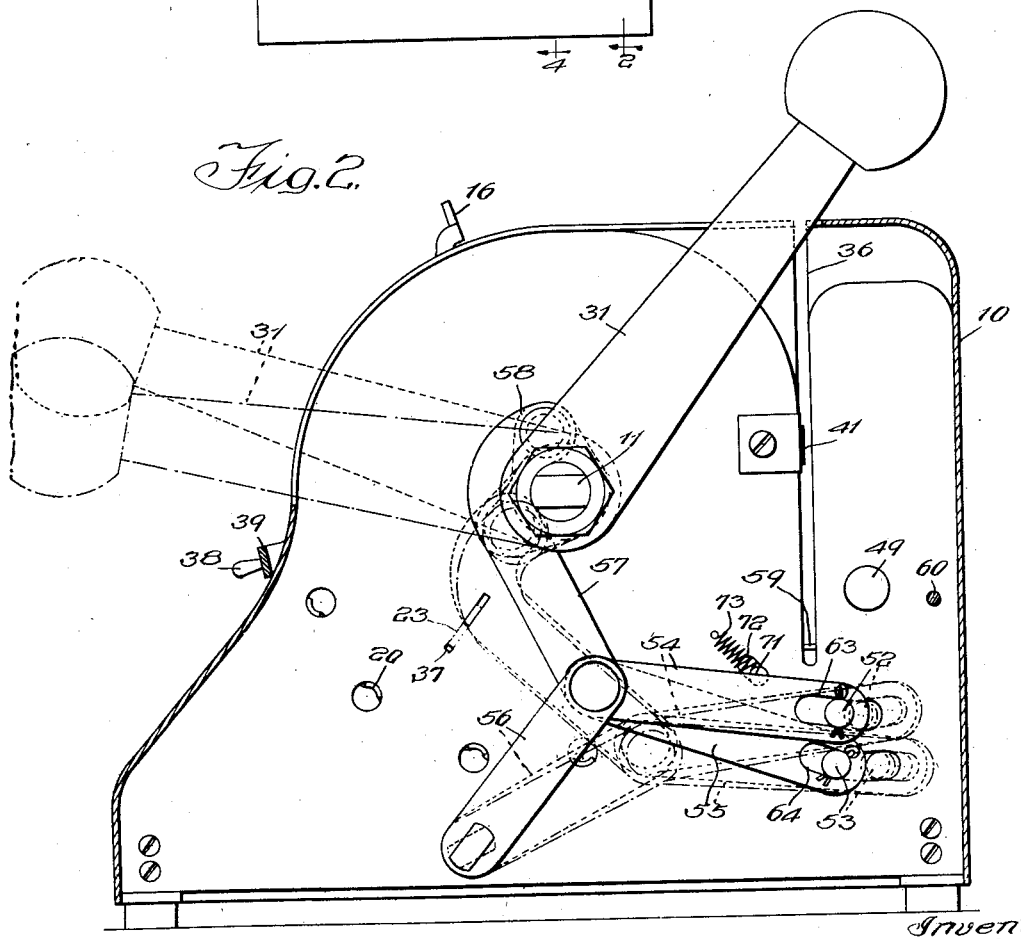
Fig. 2 is a sectional view taken on line 2—2 of Fig. 1.

It may be here stated that several of the setting devices 12 are employed as most clearly shown in Fig. 1 and that each of the setting devices has a type carrier or bar 15 associated therewith. These type setting devices are employed to control the particular relative or adjusted position which the separate type carriers assume with respect to each other to apply or perforate the check with numerals to designate the amount for which the check is drawn.

It will be noted by referring to Fig. 4 that each of the type bars 15 are of a segmental character and that these bars are loosely mounted upon the shaft 11. Each of the type bars 15 have one end of a coil spring 27 connected therewith, the opposite end of the spring being connected with a rod 28 which extends between arms 29 and 30. These arms 29 and 30 are connected for rotation with the shaft 11 and therefore will impart motion to the type carriers upon rotation of the shaft 11. A handle or lever 31 is secured to said shaft 11 and thus as the handle is rotated the shaft 11 is also rotated. A rod 32 also extends between the arms or plates 29 and 30 and this rod 32 is provided to produce means for engaging the type bars and limiting their movement by said springs 27. This bar or rod 32 also provides an element of means for moving the several type bars out of engagement with their particular stops or projections 15.

Figure 9:
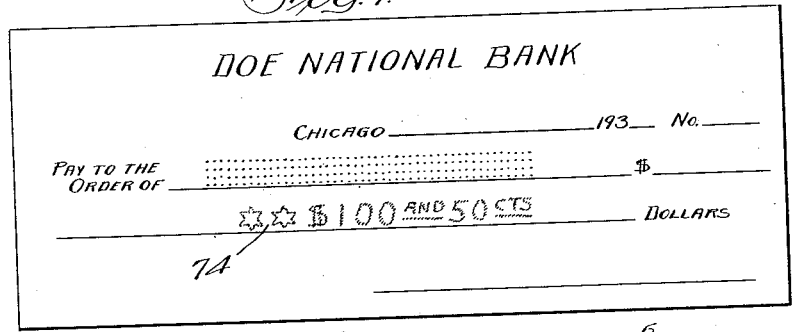
Fig. 9 is a view of a check showing the work performed by the device.

Assuming that it is desired to apply the numerals or characters to a check at the portion of the check having numerals and characters applied to the check as illustrated in Fig. 9, certain of the several type setting devices generally designated 12 will be moved until the desired character provided upon the element 18 can be viewed through the opening 33 provided in the casing 10. This will arrange the stops 14 of the respective type setting devices 12 in various angular positions in which they are maintained through the agency of their respective resilient elements 19 which seats in one of the corrugations provided in the element 20 and thus holds the respective setting devices 12 in their adjusted positions. The operator will then grasp the lever 31 and rotate same in a counter-clockwise direction as viewed in Fig. 4 which will impart movement to the arms or levers 29 and 30 carrying the rod 28 therewith. Since the coil springs 27 of each of the type carriers 15 have one end connected with the rod 28 and the opposite end thereof connected with its respective type bar, the type bars will each be moved toward the tops 14 until the type carrying elements 15 engage their respective stops. This will arrange the various characters 34 provided upon the periphery of the type carrying elements 15 in a certain prescribed position relatively to a platen generally designated 35.

It may be here stated that prior to movement of the type bars 15, the releasable locking element 23 is moved into cooperative relation with the teeth 22 carried by the segmental element 21 which locks each of the setting devices in its particular set position which, as before stated, arranges the various stops 14 of the several setting devices in position to regulate the distance of movement of the respective type bars. It is evident that when one of the type carriers 15 engages its respective stop 14, the resilient connections provided by the springs 27 between the type bars and the rod 28 and arms 29 and 30 allows movement of each of the remaining type bars until the latter are engaged by their respective stops 14. This will arrange the various characters so that when a check is inserted in the slot 36 provided in the casing 10 and the platen 35 is moved into cooperative relation with the characters provided upon the type bars, the check will be perforated with numerals and characters corresponding to those set or determined by the operator. When the perforating operation just referred to has been accomplished, the operator will again move the lever 31 in a clockwise direction to its normal position. During this movement, the rod 32 engages the edges of the several type carriers 15 and causes movement thereof to the position thereof shown in Fig. 4, it being understood that during this restoration operation, the locking element 23 is moved out of engagement with the teeth 22 so that the various setting devices 12 may be restored to a zero or neutral position. It may be here stated that the locking element 23 is reciprocably held in the slots 37 provided in the side frames of the machine and therefore movement of the arms 25 may be accomplished upon rotation of the shaft 11 through the agency of the cam 24 and cam track 26 provided in said arms 25.

A means is provided for restoring the several type setting devices to a zero or neutral position. This means is of a manually operated character and includes the finger piece 38 carried by a bale 39 which is pivotally connected for rotation about the axis of the shaft 11. The bale 39 is designed to engage the various finger pieces 16 and move them to the full line position thereof shown in Fig. 4.

An inking device 40 is employed for applying ink to the type characters provided upon the type bars 15. It will be noted that the periphery of the type bars having the characters and numerals applied thereto contact with the inking device and therefore will have ink applied to same during movement of said type bars 15 to printing and perforating position opposite the perforating platen 35 which will thus simultaneously perforate the check and apply ink to the perforations.

Again referring to Fig. 4, it will be noted that the mechanism also includes a means for perforating the material of the check at the portion thereof to which the name of the payee is applied. This mechanism includes the female perforating die 41 which is stationarily secured to the side frames of the machine and in addition includes the male portion of the die designated 42, the latter of which is movable into engagement with the female portion to perforate said portion of the check. This last mentioned mechanism provides a means for holding the check against movement with relation to other elements of the structure during the perforating and inking operation. To accomplish holding of the check the movable portion 42 of the perforating die is moved into engagement with the female portion 41 thereof prior to cooperation between the die 35 and the type carried by the type bars. The structures for supporting the male portion 42 of the perforating die and the portion 35 of the inking and perforating die are mounted upon pivoted frames respectively and generally designated 43 and 44. These frames respectively include cross pieces 45 and 46 which are respectively secured to arms 47 and 48 arranged at the opposite ends of said cross pieces 45 and 46. The frames including the arms 47 and 48 are pivotally mounted upon the shaft 49 and said arms 47 and 48 have extensions 50 and 51, the latter of which are respectively connected with the rods 52 and 53 which extend through slots in the side frames of the machine. These rods 52 and 53 are respectively connected to one end of links 54 and 55 which form part of a toggle mechanism including links 56 and 57 connected with the arm 58 secured to the shaft 11. The mechanism just explained is such that movement is imparted to the arms 47 and cross piece 45 and the die member 42 prior to movement of the cross piece 46 and its associated mechanism to thus engage and effectively hold the check within the slot 36 and prevent its movement during the perforating and inking operation.

Figure 6:
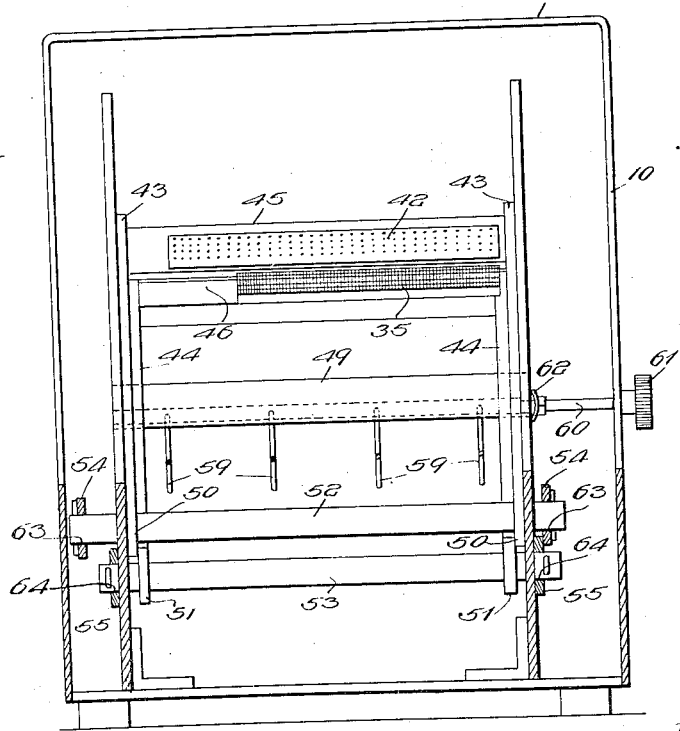
Fig. 6 is a section taken on line 6—6 of Fig. 4.

To accomplish this last named sequence of movement, the links 54 and 55 are each provided with slots 63 and 64, the latter of which, it will be noted, is of a lesser length than the slot 63 and thus one termination of the slot in the link 55 will engage the rod 53 and thus cause movement of the arm 51 and its associated elements prior to movement of the arm 48 and its associated elements. Means adjustably supporting a check in the slot 36 is provided, the means being employed to compensate for checks of different widths and provide means for supporting checks of different widths in proper relation to the perforating and inking and perforating mechanism. This means includes adjustable fingers 59 secured to a rotatable rod 60 which is mounted between the side frames of the machine as clearly shown in Fig. 6. This rod 60 has a finger piece 61 and friction means 62 for holding the check support on fingers 59 in their adjusted positions.

By referring to Fig. 9, it will be noted that means is provided for printing and perforating the word "and" and the abbreviation for the word "Cents" upon the check and means is also provided for applying the account number or any other desired information upon the check. The means for applying the word "and" and the abbreviation for the word "Cents" are respectively designated 65 and 66 and include arms 67 and 68 which are loosely mounted for rotation about the shaft 11 as a center. Each of these elements 65 and 66 are provided with coil springs similar to those designated 27 which coil springs are connected with the type bars 15 and it may be here stated that the bar 32 is employed to engage the edge of the elements 65 and 66 in a manner similar to that previously explained in conjunction with the type bars 15. It will be noted that the stationary and female die block 41 is provided with a plurality of arcuate slots 69 which allow the type bars 15 to be rotated to anyone of their several angular positions. The elements 65 and 66 which respectively carry the word "and" and the abbreviation for the word "Cents" engage the lower edge of the stationary die block 69 when rotated to this position by means of the handle 31 and therefore these last mentioned elements will be held in proper relation to the perforating die block 35 so that the words "and" and "Cents" will be applied to the check when the die block 35 is actuated.

Figure 3:
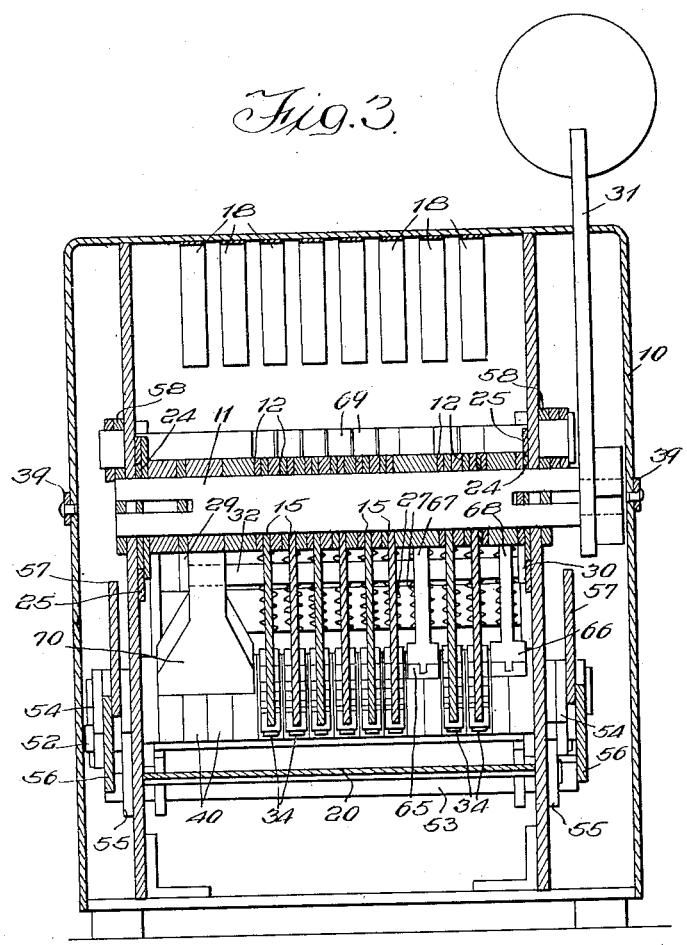
Fig. 3 is a section taken on line 3—3 of Fig. 1.
Figure 10:
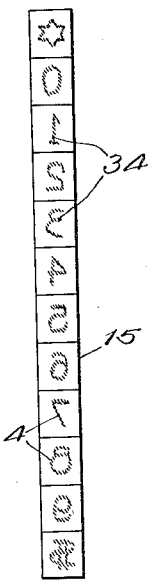
Fig. 10 is a view showing the characters applied to the type view.

As before stated, the device is provided with means for applying the account number or any other information and this means is designated 70 and is clearly shown in Fig. 3. From an inspection of Fig. 4 it can be seen that this member 70 is rotatable about the shaft 11 as a center in a manner similar to the other printing and perforating elements employed in the structure, this element 70 has a coil spring such as those designated 27 for maintaining said element 70 in movable contact with the pin 70' which projects from the arm or plate 29 which plate also forms part of a support for the rod 32.

The inking mechanism 40 which, in the present instance, is in the form of a roll of absorbent material which is designed to be saturated with ink is carried upon a shaft 71 which has its opposite ends mounted in slots 72 provided in the side plates of the machine and a coil spring 73 is employed to maintain proper contact between the inking rollers 40 and the face of the type bars, the latter of which it will be remembered are constructed to perforate and simultaneously ink the material of the check when the perforating die block 35 is brought into cooperative relation with the type on the carriers 15.

The type bars have certain symbols applied thereto in addition to numerals, the symbols being employed to perforate the check at one side of the numerals designating the amount of the check to thus prevent tampering with this portion of the check and change the amount for which the check is drawn. The symbols may be of any desired outline and may be of an outline corresponding to that illustrated at 74 in Fig. 9.

From the foregoing description of the structure, it is manifest that when anyone of the several members 12 are rotated about the axis of the shaft 11, the numerals and other indicia provided upon the arcuate strips 18 are presented at the opening 33 provided in the casing 10. Upon this movement about the shaft 11 of the elements 12, the resilient member 19 of each element 12 is moved into cooperative relation with the recesses in the corrugated arcuate element 20 which holds the respective members 12 in anyone of their several adjusted positions. This adjustment of the elements 12 causes the stops or extensions 14 of said elements 12 to assume one of several angular positions about the shaft 11 and therefore will arrest movement of its respective type bar 15 when the latter is moved into engagement with its respective stop by means of the lever 31. Movement of the lever 31 in a counter clockwise direction causes the locking bar 23 to engage the teeth 22 and holds the type setting levers 12 against any further rotative motion. Actuation of this lever 31 causes the rotatable frame including the member 29 and the bar 28 which carries the springs 27 to be rotated about the shaft 11 which carries all of the type bars such as 15 therewith until the type bars engage their respective stops 14. This will arrange certain of the characters on the type bars so that a certain character on each of the type bars 15 is arranged opposite the perforating die 35. This movement of the lever 31 also causes the elements 67, 68, and 70 to be moved by the frame including the arms 29, 30 and associated elements until said elements 67, 68 and 70 engage the lower edge of the die block 41. Upon further movement in the same direction of the lever 31, the lever or toggle mechanism hereinbefore referred to and connected with the lever 31 actuates the frame including the carrier 45 for the die block 42 which will perforate the check at the portion at which the payee's name is inscribed. The check is thus held against movement by the means just referred to and upon further movement of the arm or lever 41, the perforating die block 35 is moved into cooperative relation with the particular characters of the type bars 15 arranged adjacent the die block 35 which will cause the check to be perforated with the amount of the check together with the word "and" and the abbreviation for the word "Cents." It will be noted that during this movement of the type bars 15, the type first rides over the inking device 40 and becomes inked which will thus ink the perforations designating the amount for which the check is drawn.

It may be here stated that the foremost character or symbol relatively to the travel of the type bars to printing and perforating position may be star-shaped or any other desired outline and therefore when the levers such as 12 are left in a normal position as shown in full lines in Fig. 4, these characters just referred to will be brought to printing position to thus apply these characters in a manner similar to that shown in Fig. 9. It is further evident that when the lever 31 is moved in a clockwise direction, the perforating die 42 is moved to release the check and the perforating and printing die 35 is moved out of cooperative relation with the characters provided upon the type bars and further movement of the lever 31 in this last mentioned direction causes the rod 32 to engage all of the type bars to restore them to an inoperative position, in which position they remain until the levers 12 are again adjusted to print and perforate another amount upon a check.

Having thus described the invention, what I claim and desire to cover by Letters Patent is:

1. In a device of the kind described the combination of a plurality of pivoted type bars, means for moving said type bars, a plurality of setting elements movable to various positions of angularity with which said type bars cooperate, means for locking said setting devices in adjusted position, said setting devices having stops provided therein with which said type bars engage to limit movement of said type bars, a platen, and means for moving the platen into printing relation with said type bars.

2. In a device of the kind described the combination of a plurality of pivoted type bars, a plurality of pivoted type setting devices, means for locking said setting devices in various positions of angularity, means for moving said type bars into engagement with the type setting devices, inking means with which said type bars engage during movement and a platen movable into cooperative relation with said type bars.

3. In a device of the kind described the combination of a plurality of arcuate and pivotally movable type bars, a plurality of adjustably pivoted setting devices arranged for movement upon an axis corresponding to the axis of said type bars, means for locking said setting devices in one of a plurality of adjusted positions, means for moving said type bars into engagement with said setting devices, inking means with which said type bars engage during movement, perforating means providing holding means and a platen movable into cooperative relation with said type bars and means for moving said perforating means to hold a check for engagement by said platen.

4. In a device of the kind described the combination of a plurality or arcuate pivotally movable type bars, a plurality of concentrically arranged and independently movable type setting devices having stops with which said type bars engage, means for holding said setting devices in adjusted position and means for locking said type setting devices in their adjusted positions, means for moving said type bars into engagement with said stops and a platen movable into engagement with said type bars.

5. In a device of the kind described the combination of a plurality of arcuate pivotally movable type bars, a plurality of independently operable accurately movable type bar setting devices arranged concentrically with said type bars, means for moving said type bars in unison and into relatively different positions defined by said setting devices, inking means with which said type bars engage during movement and a platen movable into cooperative relation with said type bars.

6. In a device of the kind described the combination of a plurality of arcuate pivotally movable type bars, a plurality of independently movable levers providing type bar setting devices arranged concentrically to said type bars, said setting devices each having means movable therewith to different arcuate positions defined by the position of said levers, means for moving said type bars in unison and into engagement with said means of the respective type bars, an inking roller with which said type bars engage and a platen movable into cooperative relation with said type bars.

7. In a device of the kind described the combination of a plurality of arcuate pivotally movable type bars, an adjustable type bar setting device associated with each arcuate pivotally movable type bar, each setting device having an arcuately movable stop with which the type bar cooperates to define the printing position of said type bar, a platen, said stops being movable to relatively different angular positions with respect to said type bars, an inking device for inking the type on said type bars, said inking device and type bar being in contact with each other during movement of said type bar relatively to said platen and means for moving said platen into cooperative relation with said type bar.

8. In a device of the kind described the combination of a shaft, a plurality of type bars loosely mounted upon said shaft, type bar setting means also mounted upon said shaft, said setting means being adjustable and providing means for limiting movement of said type bars, means for moving said type bars into cooperative relation with said setting means and including a yieldable connection providing means allowing one type bar to assume a different position relatively to another type bar, a platen and means for moving said platen into cooperative relation with said type bars.

9. In a device of the kind described the combination of a plurality of type bars, a shaft upon which said type bars are loosely mounted, type bar setting devices mounted upon said shaft, said setting devices being movable relatively to each other and being also movable relatively to said type bars, means for moving said type bars in opposite directions relatively to said setting means, said means including means whereby one type bar is movable relatively to another and providing means whereby said type bars may be arranged in relatively different positions with respect to a platen which cooperates with said type bars.

10. In a device of the kind described the combination of a plurality of type setting devices each having a stop, said devices being mounted for movement to arrange said stops in relatively different angular positions defined by the movement of said devices, type bars mounted for rotation with respect to said setting devices, means for moving said type bars relatively to said devices into engagement with said stops and including means whereby one of said type bars may be moved relatively to another to thereby arrange said type bars in relatively different positions with respect to each other.

11. In a device of the kind described the combination of a plurality of type setting devices each having a stop, said devices being mounted for movement to arrange said stops in relatively different angular positions defined by the movement of said devices, type bars mounted for rotation with respect to said setting devices, means for moving said type bars relatively to said devices into engagement with said stops and including means whereby one of said type bars may be moved relatively to another to thereby arrange said type bars in relatively different positions with respect to each other, and inking means engaging said type bars during rotation thereof.

12. In a device of the kind described the combination of a plurality of type setting devices each having a stop, said devices being mounted for movement to arrange said stops in relatively different angular positions defined by the movement of said devices, type bars mounted for rotation with respect to said setting devices, means for moving said type bars relatively to said devices into engagement with said stops and including means whereby one of said type bars may be moved relatively to another to thereby arrange said type bars in relatively different positions with respect to each other, perforating means providing holding means and a platen for cooperation with said type bars.

13. In a device of the kind described the combination of a plurality of members providing type setting devices each member having a stop, said devices being mounted for movement to arrange each of said stops in relatively different angular positions, type bars mounted for rotation with respect to said setting devices, means for moving said type bars relatively to said devices into engagement with said stops and including means whereby one of said type bars may be moved relatively to another to thereby arrange said type bars in relatively different positions with respect to each other, perforating means providing holding means and a platen for cooperation with said type bars and means for actuating said perforating means and platen, said means for actuating said perforating means and platen including means whereby said perforating means is operated to perforate and hold a check in position for engagement by said platen.

14. In a device of the kind described the combination of a plurality of type setting devices each having a stop, said devices being mounted for movement to arrange said stops in relatively different angular positions, type bars mounted for rotation with respect to said setting devices, means for moving said type bars relatively to said devices into engagement with said stops and including means whereby one of said type bars may be moved relatively to another to thereby arrange said type bars in relatively different positions with respect to each other, locking means for locking said setting means against movement, a platen for cooperating with the type bars and means for actuating said locking means to lock said setting means and hold the same against movement upon actuation of said platen.

15. In a device of the kind described the combination of a plurality of type setting devices each having a stop, said devices being mounted for movement to arrange said stops in relatively different angular positions, type bars mounted for rotation with respect to said setting devices, means for moving said type bars relatively to said devices into engagement with said stops and including means whereby one of said type bars may be moved relatively to another to thereby arrange said type bars in relatively different positions with respect to each other, means disposed in the path of travel of said setting means providing means for holding said setting means in adjusted position and means for locking said means in adjusted position.

16. In a device of the kind described, the combination of a plurality of levers, each lever having a stop adapted to be arranged in various angular positions defined by the position of said lever, means cooperating with said lever to hold said lever in various positions of angularity, pivoted type bars, means for rotating said type bars into various positions defined by the positions of said stops, and locking means for locking said levers against movement of said type bars.

17. In a device of the kind described, the combination of a plurality of levers, each lever having a stop adapted to be arranged in various positions of angularity and having an element of a holding device and an element of a locking device, pivoted type bars, means for rotating said type bars into various positions defined by the position of said stops, and means cooperating with said locking means for locking said levers against movement by said type bars.

In witness whereof, I hereunto subscribe my name this 21st day of October, A. D. 1930.

RAY C. SMITH.